(12) United States Patent
Ohta

(10) Patent No.: US 8,661,918 B2
(45) Date of Patent: Mar. 4, 2014

(54) FORCE SENSOR, ROBOT APPARATUS, ROBOT HAND, AND DETECTING DEVICE

(75) Inventor: Tomoichiro Ohta, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 13/360,580

(22) Filed: Jan. 27, 2012

(65) Prior Publication Data

US 2012/0205931 A1    Aug. 16, 2012

(30) Foreign Application Priority Data

Feb. 15, 2011    (JP) .................. 2011-029738

(51) Int. Cl.
*G01L 1/12* (2006.01)
*G01L 25/00* (2006.01)

(52) U.S. Cl.
USPC ........................................ 73/862.69; 73/1.08

(58) Field of Classification Search
USPC ................. 73/1.08, 862.381, 862.68, 862.69
See application file for complete search history.

(56) References Cited

U.S. PATENT DOCUMENTS

| 4,254,395 A | 3/1981 | Herden |
| 5,195,382 A | 3/1993 | Peilloud |
| 5,479,607 A | 12/1995 | Tasaki et al. |
| 2004/0255687 A1* | 12/2004 | Dukart .......................... 73/779 |
| 2005/0000269 A1* | 1/2005 | Kato et al. ..................... 73/1.75 |
| 2010/0175487 A1* | 7/2010 | Sato .......................... 73/862.69 |

FOREIGN PATENT DOCUMENTS

| CN | 101539463 A | 9/2009 |
| CN | 101779110 A | 7/2010 |
| EP | 0417317 A1 | 3/1991 |
| JP | 2-251727 A | 10/1990 |
| JP | 2004-325328 A | 11/2004 |
| JP | 2005-321592 A | 11/2005 |

OTHER PUBLICATIONS

Chinese Office Action dated Nov. 29, 2013 issued in corresponding Chinese Patent Application No. 2012-10033391.8.

* cited by examiner

*Primary Examiner* — Hezron E Williams
*Assistant Examiner* — David Z Huang
(74) *Attorney, Agent, or Firm* — Fitzpatrick, Cella, Harper & Scinto

(57) ABSTRACT

A force sensor of the present invention corrects the output voltages of Hall elements without using a temperature sensor in response to changes in the characteristics of a magnet and the Hall elements.

13 Claims, 13 Drawing Sheets

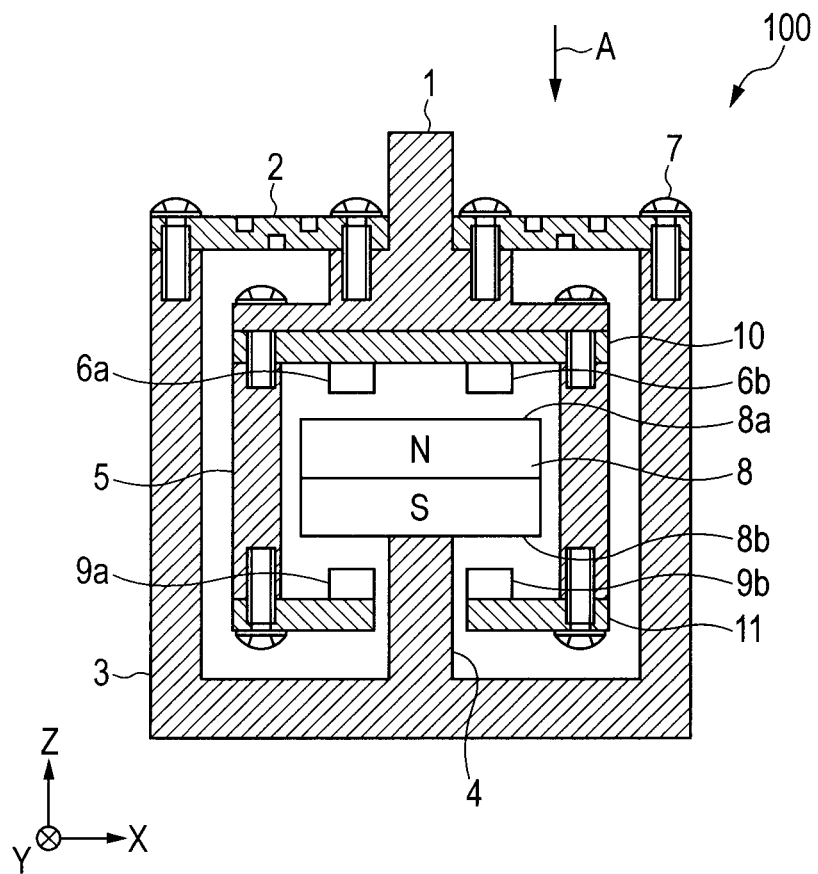
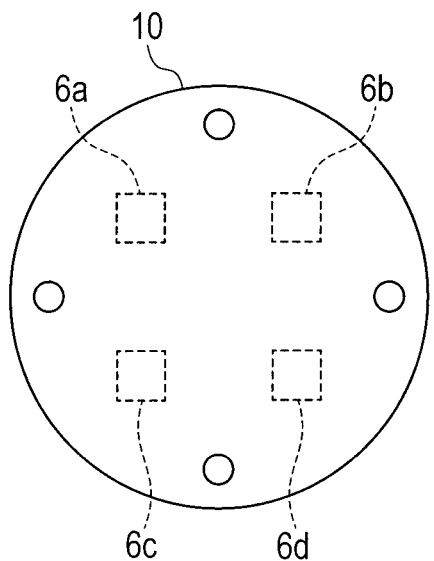
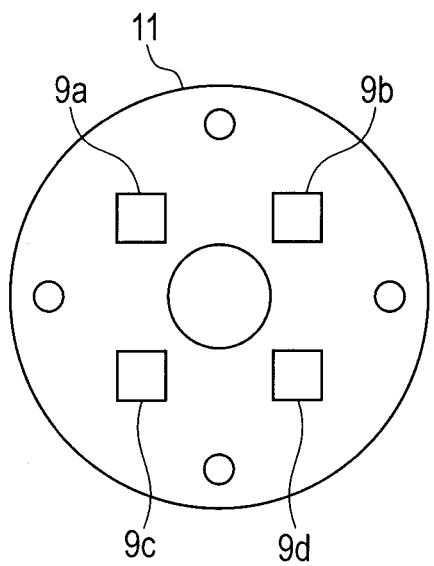
FIG. 2A
FIG. 2B
FIG. 2C

FORCE SENSOR, ROBOT APPARATUS, ROBOT HAND, AND DETECTING DEVICE

BACKGROUND OF THE INVENTION

1. Field of the Invention

The present invention relates to a force sensor which detects at least one of a force and a moment applied to an operating section on the basis of the value of an output voltage of a magnetic-electric conversion element, such as a Hall element, when an external force acts on the operating section, causing the magnetic-electric conversion element to be relatively displaced with respect to a magnet. Further, the present invention relates to a robot apparatus in which a portion connecting the distal end of a multi-joint robot arm and an end effector is provided with a sensor main body of a force sensor and which allows the posture and the driving force of a robot arm to be controlled by the force detected by the force sensor, thus achieving smooth assembly.

2. Description of the Related Art

When assembling components or members by an automatic assembling apparatus formed of a robot apparatus, the assembling operation cannot be smoothly achieved unless each component or member is accurately positioned by a robot hand of the robot apparatus. For example, in the fitting assembly operation for gears, pins or the like, even slightest misalignment of an axial center has been preventing vertical insertion from being accomplished, resulting in an assembly failure.

To solve the problem described above, there is a robot apparatus in which the section connecting the distal end of a robot arm of the robot apparatus and an end effector is provided with a force sensor for detecting a force in the direction of each of an X-axis, a Y-axis and a Z-axis applied between the robot arm and the end effector and a moment about each of the axes. The posture and the driving force of the robot arm are controlled on the basis of the forces and moments detected by the force sensor, thus permitting smooth assembly.

A predominant conventional force sensor is a type in which strain gauges are provided on a flexible beam connecting a frame and an operating section, and a force and a moment are detected on the basis of change in the resistance of the strain gauges. However, in a force sensor using strain gauges, a plurality of strain gauges is disposed on the same beam. Hence, when a flexure portion is subjected to a force, there is other axis interference, in which a strain occurs not only in the direction of an axis in which a force is applied but a strain occurs also in the direction of axis in which the force is not applied. It is difficult, in principle, to achieve a beam construction that is not affected by forces in the directions of any other axes in order to minimize the influences of the other axis interference. For this reason, it has been required to carry out post-processing on the amount of interference of a component of another axis on the basis of a detected signal thereby to, for example, subtract the influence by devising signal processing or the like in a subsequent stage. This has been disadvantageous in achieving a reduced size and lower cost.

Meanwhile, there has been proposed a force sensor adapted to magnetically detect the displacement of an operating section (refer to Japanese Patent Application Laid-Open No. 2004-325328). In the force sensor, four Hall elements are disposed, facing against a pole surface of a permanent magnet embedded in an elastic member. When an acting force is applied, the permanent magnet is displaced. A change in a magnetic flux attributable to the displacement is detected by magnetic-electric conversion elements, such as the Hall elements. This permits the detection of the force components in the directions of three axes, namely, in the direction of the X-axis, the direction of the Y-axis, and the direction of the Z-axis. An electromagnet may be used in place of the permanent magnet. For the convenience of explanation, Hall elements may be used to represent the magnetic-electric conversion elements in the following description. This, however, should not be deemed that the magnetic-electric conversion elements are limited only to Hall elements.

Each of a permanent magnet and an electromagnet (hereinafter referred to as "the magnet" in some cases) has a predetermined temperature coefficient in relation to the intensity of a magnetic field to be generated. Hence, the intensity of a magnetic field changes according to the influences of temperature or heat in a surrounding environment of the sensor, including a change in an environmental temperature, the heat from a motor, which is driving force source for a robot, or heat from a signal processor in a circuit board. Further, regarding a magnetic-electric conversion element, such as a Hall element or an MR element, the output voltage thereof (the Hall voltage in the case of a Hall element), which is proportional to a magnetic flux, changes as the environment temperature changes. In other words, as the environmental temperature changes, the detection sensitivity of a magnetic-electric conversion element changes.

Meanwhile, there has been proposed a method for making a temperature-based correction for a Hall element by a temperature compensation circuit having a temperature sensor (refer to Japanese Patent Application Laid-Open No. 2005-321592). According to the method, if the output voltage of a Hall element falls due to a temperature rise, then the current supplied to the Hall element is increased in proportion to a temperature rise due to a negative temperature characteristic of the temperature sensor. The increased current output to the Hall element regains the output voltage that has decreased due to the temperature rise.

To correct the temperature of a magnetic-electric conversion element by using a temperature compensation circuit, it is necessary to compensate for a change in an output voltage, which is a detection magnetic flux, by providing a temperature sensor also in the vicinity of a magnet, because not only the characteristics of the magnetic-electric conversion element but also the magnetic flux of the magnet changes when an environmental temperature changes.

It is difficult, however, to accurately measure the average temperature of the magnet by using the temperature sensor because of the difference in heat capacity between the magnet and the temperature sensor or the difference in the positional relationship between the temperature sensor and the magnet when a local temperature rise takes place. Further, it would be required to provide the magnet and the magnetic-electric conversion element with temperature sensors exclusively used for correcting temperature characteristics, thus complicating the circuit.

SUMMARY OF THE INVENTION

Accordingly, an object of the present invention is to provide a force sensor which corrects an output voltage of a magnetic-electric conversion element, such as a Hall element, without using a temperature sensor in response to a change in the characteristics of a magnet and the magnetic-electric conversion element caused by a change in an environmental temperature, a robot apparatus and a robot hand, which incorporate the force sensor, and a detecting device.

A force sensor in accordance with the present invention includes: a sensor main body; and a detecting device connected to the sensor main body, wherein the sensor main body has: a frame; an operating section which is elastically supported by the frame and which is displaced relative to the frame when subjected to an external force; a magnet which is disposed in the frame and secured to the frame; an n number (n denotes an integer of 2 or more) of first Hall elements, which are secured to the operating section with intervals provided thereamong, facing against one pole surface of the magnet, which are displaced together with the operating section relative to the one pole surface and which output voltages of values that are proportional to supplied currents and passing magnetic fluxes; and an n number of second Hall elements which are secured to the operating section with intervals provided thereamong, facing against the other pole surface of the magnet, which are displaced together with the operating section relative to the other pole surface, and which output voltages of values that are proportional to supplied currents and passing magnetic fluxes, and the detecting device includes: constant current sources, the quantity of which corresponds to the quantity of the Hall elements, the constant current sources supplying currents of set current values to the n number of the first Hall elements and the n number of second Hall elements; voltage detectors, the quantity of which corresponds to the quantity of the Hall elements, the voltage detectors detecting the voltage value of the Hall voltage of each of the n number of the first Hall elements and the n number of the second Hall elements; a processor which determines at least one of a force and a moment acting on the operating section on the basis of a voltage value of a Hall voltage detected by each of the voltage detectors; a sum computing section which determines a total voltage value of the absolute values of the voltage values of the Hall voltages detected by the voltage detectors; and an adjustor which adjusts the set current value of each of the constant current sources such that the total voltage value becomes a predetermined reference voltage value.

According to the present invention, the first Hall elements are disposed, opposing one pole surface of the magnet and the second Hall elements are disposed, opposing the other pole surface of the magnet, and the relative positions of the first and the second Hall elements are fixed. The total voltage value of output voltage values indicative of a total magnetic flux detected by all the Hall elements disposed as described above is not changed by a relative displacement of the first Hall elements and the second Hall elements with respect to the magnet, but is changed when the characteristics of the magnet and the Hall elements change. The set current values of the constant current sources, which supply currents to the Hall elements, are adjusted such that the total voltage value becomes the reference voltage value, thereby maintaining the total voltage value at a fixed value. Hence, the Hall voltage output from each Hall element is not affected by temperature changes, secular changes or the like, thus remaining stable even if the magnetic fluxes of the magnet and the detection sensitivities of the Hall elements change due to temperature changes, secular changes or the like. With this arrangement, the Hall voltages of the Hall elements can be corrected by a simple construction without using temperature sensors even if the characteristics of both magnet and Hall elements change due to temperature changes, secular changes or the like.

Further features of the present invention will become apparent from the following description of exemplary embodiments with reference to the attached drawings.

BRIEF DESCRIPTION OF THE DRAWINGS

FIG. 2A is a schematic diagram of a section taken along an X-Z axis of a sensor main body of the force sensor.

FIG. 2B is a top plan view of a first sensor board of the sensor main body of the force sensor observed from a direction indicated by arrow A in FIG. 2A.

FIG. 2C is a top plan view of a second sensor board of the sensor main body of the force sensor observed from the direction indicated by arrow A in FIG. 2A.

DESCRIPTION OF THE EMBODIMENTS

Preferred embodiments of the present invention will now be described in detail with reference to the accompanying drawings.

First Embodiment

Although Hall elements will represent magnetic-electric conversion elements in the following description, other magnetic-electric conversion elements, such as MR elements, may be of course used.

Figure 1:
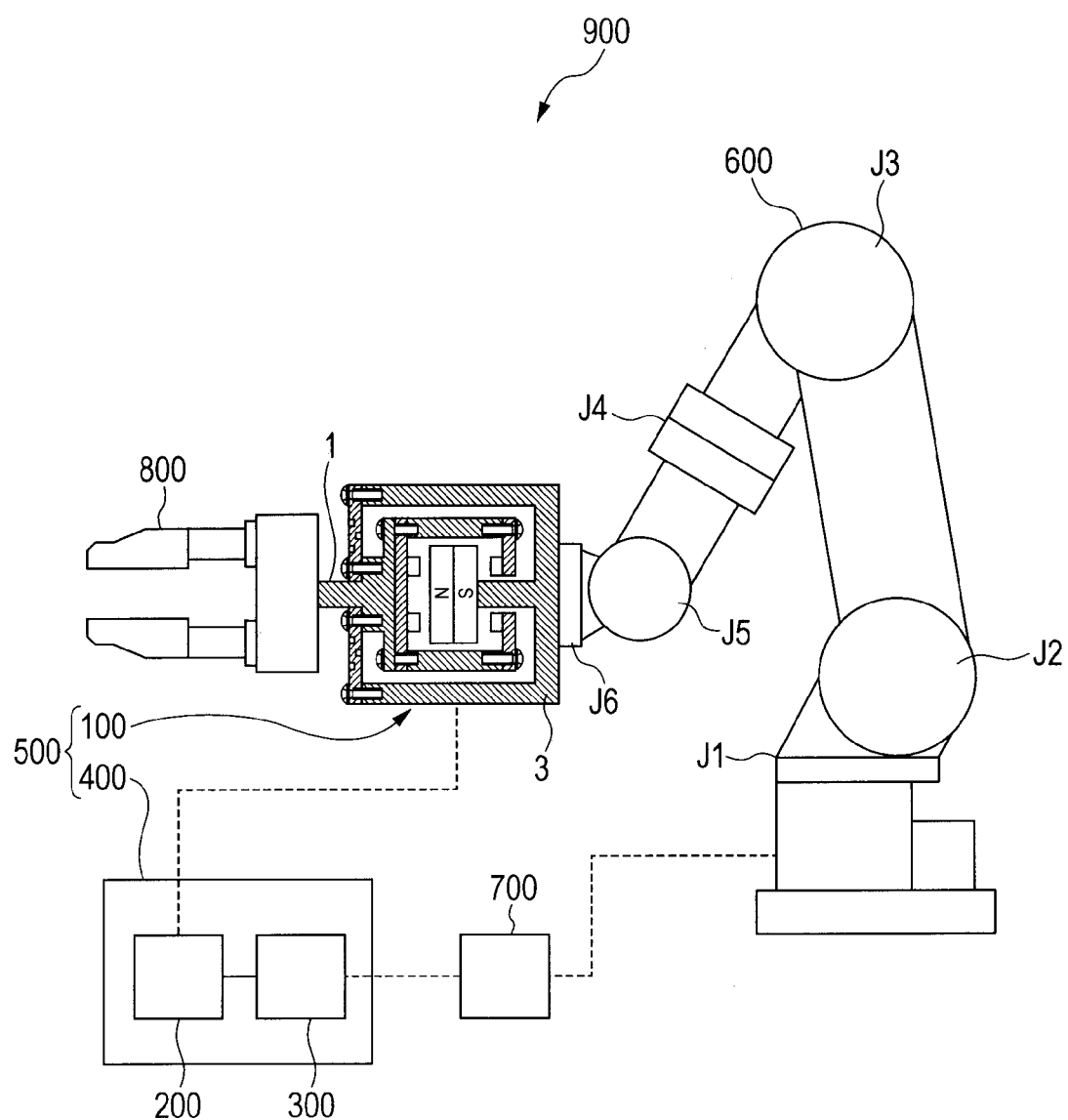
FIG. 1 is a schematic diagram illustrating the construction of a robot apparatus incorporating a force sensor according to a first embodiment of the present invention.

FIG. 1 is a schematic diagram illustrating the construction of a robot apparatus having a force sensor according to a first embodiment of the present invention. A robot apparatus 900 shown in FIG. 1 has a multi-joint (six joints, J1 to J6, in the first embodiment) robot arm 600 and a robot hand 800 serving as an end effector provided at the distal end of the robot arm 600. Further, the robot apparatus 900 has a force sensor 500 and a robot controller 700 which controls the operations of the robot arm 600 and the robot hand 800. The force sensor 500 has a sensor main body 100 and a detecting device 400 connected to the sensor main body 100. The sensor main body 100 is disposed, interposing between the distal end of the robot arm 600 and the robot hand 800. In other words, the distal end of the robot arm 600 is directly provided with the sensor main body 100. Further, the distal end of the robot arm 600 is provided with the robot hand 800 through the intermediary of the sensor main body 100.

As illustrated in FIG. 2A, the sensor main body 100 has an outer frame 3 serving as a frame formed of a rigid member, which is substantially shaped like a box with the upper end thereof open, and a plate-like elastic member 2, which is elastically deformable and which is secured to the outer frame by fixing members 7, such as screws, surrounding the opening at the upper end of the outer frame 3. The sensor main body 100 is further provided with an operating section 1, which is secured to the elastic member 2 and which is elastically supported by the outer frame 3 through the intermediary of the elastic member 2. The operating section 1 is disposed such that it extends into and out of the outer frame 3 via a through hole in the elastic member 2. Further, the operating section 1 is displaced in the directions of three axes, namely, an X-axis, a Y-axis, and a Z-axis, which are orthogonal to each other, with respect to the outer frame 3 and also displaced about each of the axes when an external force is applied to the portion of the operating section 1 that juts out of the outer frame 3. In other words, the operating section 1 has six degrees of freedom relative to the outer frame 3. The operating section 1 may be integrally formed with the elastic member 2.

Figure 3:
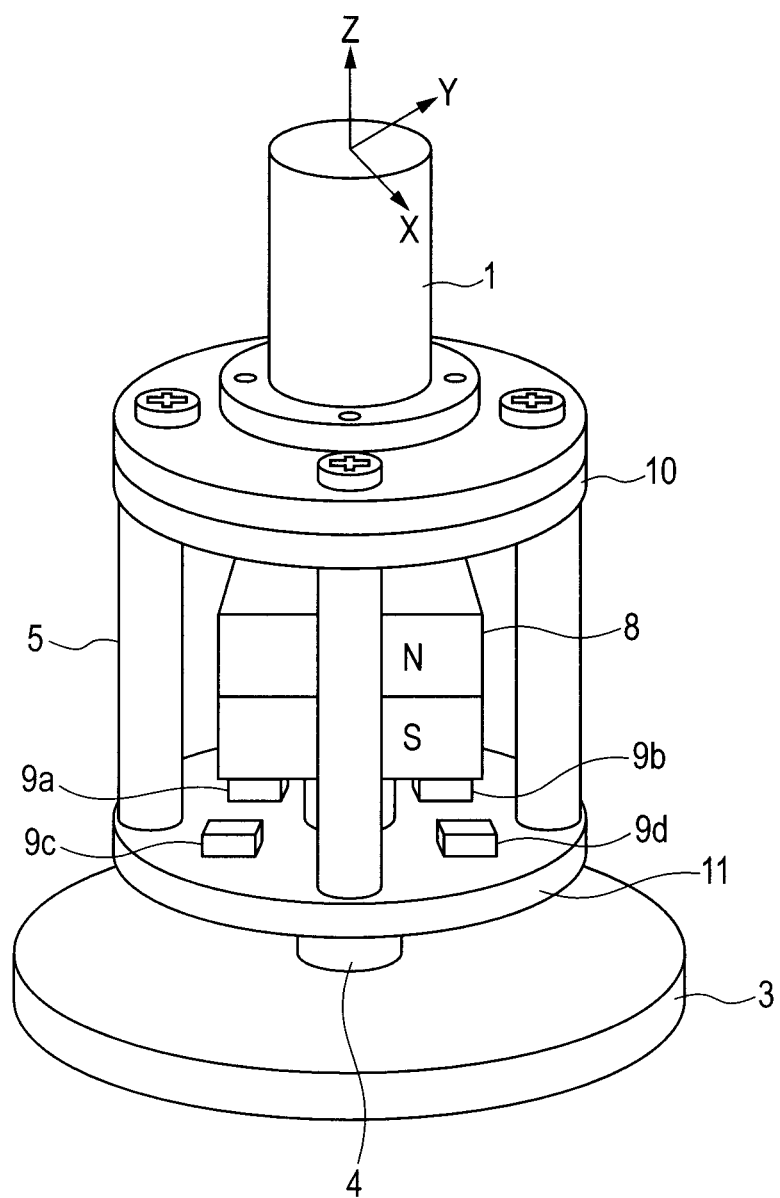
FIG. 3 is a perspective view of a member disposed in an outer frame in the sensor main body of the force sensor.

The sensor main body 100 also includes a permanent magnet 8 serving as a magnet disposed in the outer frame 3, as illustrated in FIG. 2A and FIG. 3. Inside the outer frame 3 and at the bottom of the outer frame 3, a columnar support 4 for fixing the permanent magnet 8 is formed integrally with the outer frame 3. The permanent magnet 8 is secured to the columnar support 4 so as to be secured integrally with the outer frame 3. The permanent magnet 8 is formed of a magnet typically represented by an Nd—Fe—B magnet, an Sm—Co magnet, an Sm—Fe—N magnet, or a ferrite magnet. Although a magnet is used as the permanent magnet 8 in the present embodiment, an electromagnet, which is made by winding a coil around a magnetic material and which generates magnetic forces when energized, may alternatively be used.

The sensor main body 100 has a first sensor board 10, which is secured to the operating section 1 and which is disposed, opposing one pole surface 8a of the permanent magnet 8 with an interval provided therebetween. The sensor main body 100 also has a second sensor board 11, which is secured to the operating section 1 through the intermediary of a board connecting member 5 and which is disposed, opposing the other pole surface 8b of the permanent magnet 8 with an interval provided therebetween.

The sensor main body 100 has first Hall elements 6a, 6b, 6c and 6d (refer to FIG. 2B) as an n number (n denoting an integer of 2 or more, the n in the present embodiment being 4) of magnetic-electric conversion elements, which are secured to the first sensor board 10 and disposed, facing against one pole surface 8a of the permanent magnet 8, with intervals provided thereamong. Further, the sensor main body 100 has an n number (n being 4 in the present embodiment) of second Hall elements 9a, 9b, 9c and 9d (refer to FIG. 2C), which are secured to the second sensor board 11 and disposed, facing against the other pole surface 8b of the permanent magnet 8, with intervals provided thereamong. In other words, the first and the second Hall elements are disposed on the operating section 1 such that they may be displaced relative to the permanent magnet 8.

The four first Hall elements 6a to 6d and the four second Hall elements 9a to 9d are preferably provided to determine the force components in the directions of the three axes that are orthogonal to each other and the moment component about each of the axes.

The number of the magnetic-electric conversion elements may be appropriately determined according to the type of force and moment to be detected.

The first Hall elements 6a, 6b, 6c and 6d are arranged at equal intervals on the same circle. Similarly, the second Hall elements 9a, 9b, 9c and 9d are arranged at equal intervals on the same circle. The first Hall elements 6a, 6b, 6c and 6d and the second Hall elements 9a, 9b, 9c and 9d are symmetrically disposed with respect to a symmetry plane having the permanent magnet 8 as the center thereof.

With the Hall elements 6a to 6d and 9a to 9d arranged as described above, the first Hall elements 6a to 6d are displaced relative to one pole surface 8a of the permanent magnet 8 when the operating section 1 is displaced relative to the outer frame 3. The second Hall elements 9a to 9d are also displaced relative to the other pole surface 8b of the permanent magnet 8. In other words, when an external force is applied to the operating section 1, the first Hall elements 6a to 6d and the second Hall elements 9a to 9d are displaced relative to the permanent magnet 8 while maintaining the relative positions thereof through the intermediary of the board connecting member 5.

The Hall elements 6a to 6d and 9a to 9d output Hall voltages (output voltages) of values that are proportional to currents supplied to the Hall elements and magnetic fluxes that have passed the Hall elements. The Hall elements 6a to 6d and 9a to 9d use the same specifications and share substantially the same characteristics.

Figure 4A:
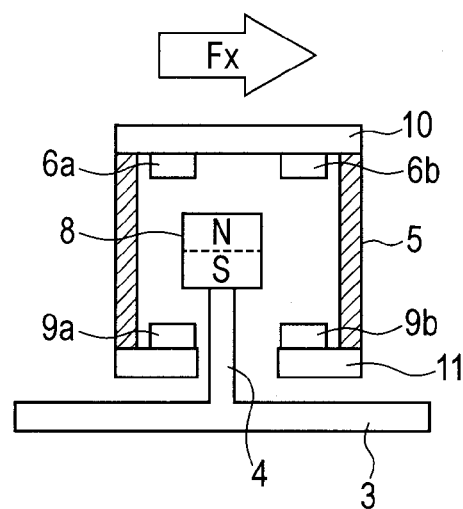
FIG. 4A is a schematic sectional diagram of the sensor main body of the force sensor in the case where an operating section is subjected to a force Fx in the direction of an X-axis.
Figure 4B:
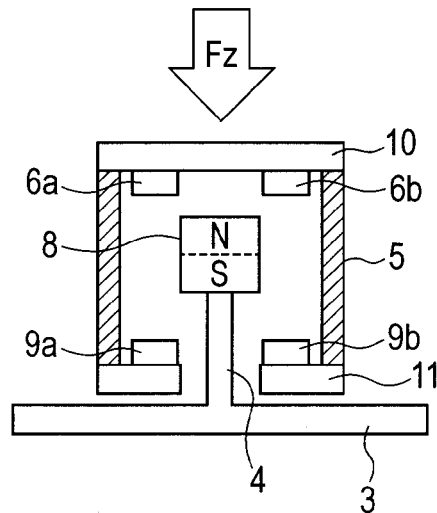
FIG. 4B is a schematic sectional diagram of the sensor main body of the force sensor in the case where the operating section is subjected to a force Fz in the direction of a Z-axis.
Figure 4C:
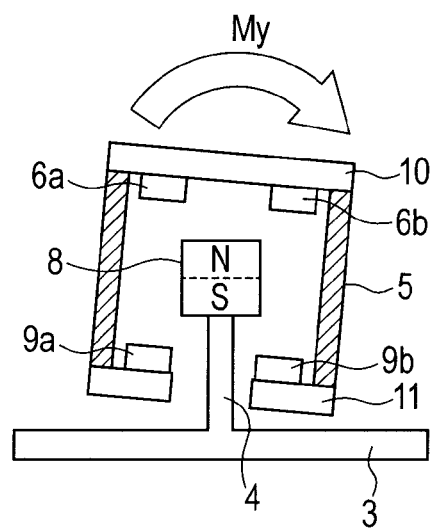
FIG. 4C is a schematic sectional diagram of the sensor main body of the force sensor in the case where the operating section is subjected to a moment My about a Y-axis.

With the construction described above, using the sensor main body 100 according to the present embodiment makes it possible to determine a force component in the direction of each of the three axes, which are orthogonal to each other, and a moment component about each axis when a force and a moment are applied to the operating section 1. The following will describe the method for calculating the force components and the moment components with reference to FIGS. 4A to 4C. FIGS. 4A to 4C are schematic sectional view of the sensor main body 100. FIG. 4A illustrates a case where the operating section 1 is subjected to a force Fx in the direction of the X-axis, FIG. 4B illustrates a case where the operating section 1 is subjected to a force Fz in the direction of the Z-axis, and FIG. 4C illustrates a case where the operating section 1 is subjected to a moment My about the Y-axis.

If a magnetic flux density displacement $-\Delta Bx$ occurs in the Hall element 6a due to the force Fx in the direction of the X-axis, as illustrated in FIG. 4A, then magnetic flux density displacements $\Delta Bx$, $-\Delta Bx$, and $\Delta Bx$ will occur in the Hall elements 6b, 9a, and 9b, respectively.

If a magnetic flux density displacement $-\Delta Bz$ occurs in the Hall element 6a due to the force Fz in the direction of the Z-axis, as illustrated in FIG. 4B, then magnetic flux density displacements $-\Delta Bz$, $\Delta Bz$, and $\Delta Bz$ will occur in the Hall elements 6b, 9a, and 9b, respectively.

Further, if a magnetic flux density displacement $\Delta By$ occurs in the Hall element 6a due to the moment My in the direction of the Y-axis, as illustrated in FIG. 4C, then magnetic flux density displacements $-\Delta By$, $-\Delta By$ and $\Delta By$ will occur in the Hall elements 6b, 9a, and 9b, respectively.

The total magnetic flux density displacement in the Hall element 6a is denoted by $\Delta B6a$, the total magnetic flux density displacement in the Hall element 6b is denoted by $\Delta B6b$, the total magnetic flux density displacement in the Hall element 9a is denoted by $\Delta B9a$, and the total magnetic flux density displacement in the Hall element 9b is denoted by $\Delta B9b$.

The total magnetic flux density displacements are determined according to the following expressions:

$$\Delta B6a = -\Delta Bx - \Delta Bz + \Delta By$$

$$\Delta B6b = \Delta Bx - \Delta Bz - \Delta By$$

$$\Delta B9a = -\Delta Bx + \Delta Bz - \Delta By$$

$$\Delta B9b = \Delta Bx + \Delta Bz + \Delta By$$

Then, the Hall elements that are relative to each other on individual axes are paired, and the difference therebetween is determined. Incidentally, kx, kz and ky denote proportionality coefficients for calculating forces and moments from magnetic flux density displacements.

$$Fx = (\Delta B6b + \Delta B9b) - (\Delta B6a + \Delta B9a)$$
$$= kx \times \Delta Bx$$

$$Fz = (\Delta B9a + \Delta B9b) - (\Delta B6a + \Delta B6b)$$
$$= kz \times \Delta Bz$$

$$My = (\Delta B6a + \Delta B9b) - (\Delta B9a + \Delta B6b)$$
$$= ky \times \Delta By$$

In the same manner, a force Fy in the direction of the Y-axis, a moment Mx in the direction of the X-axis, and a moment Mz in the direction of the Z-axis can be calculated. The aforesaid procedure leaves only the term of a magnetic flux density displacement observed when a force is applied independently to each axis, thus permitting easy calculation of a force component generated in the direction of each axis and a moment component generated about each axis. In the present embodiment, the Hall elements 6a to 6d and 9a to 9d are used, so that the forces Fx, Fy and Fz and moments Mx, My and Mz can be determined on the basis of the Hall voltages of the Hall elements.

One of the operating section 1 and the outer frame 3 of the sensor main body 100, namely, the outer frame 3 in the first embodiment, is secured to the distal end of the robot arm 600 and the other, namely, the operating section 1 in the first embodiment, is secured to the robot hand 800. Alternatively, the outer frame 3 may be secured to the robot hand 800 and the operating section 1 may be secured to the distal end of the robot arm 600. The detecting device 400 shown in FIG. 1 includes a circuit assembly 200 which detects the Hall voltages from the Hall elements 6a to 6d and 9a to 9d of the sensor main body 100 and outputs the detection results, and a processor 300 which determines the force and the moment acting on the operating section 1. The processor 300 sends the force component outputs to the robot controller 700. The robot controller 700 controls the posture of the robot arm 600 on the basis of the force components.

Figure 5:
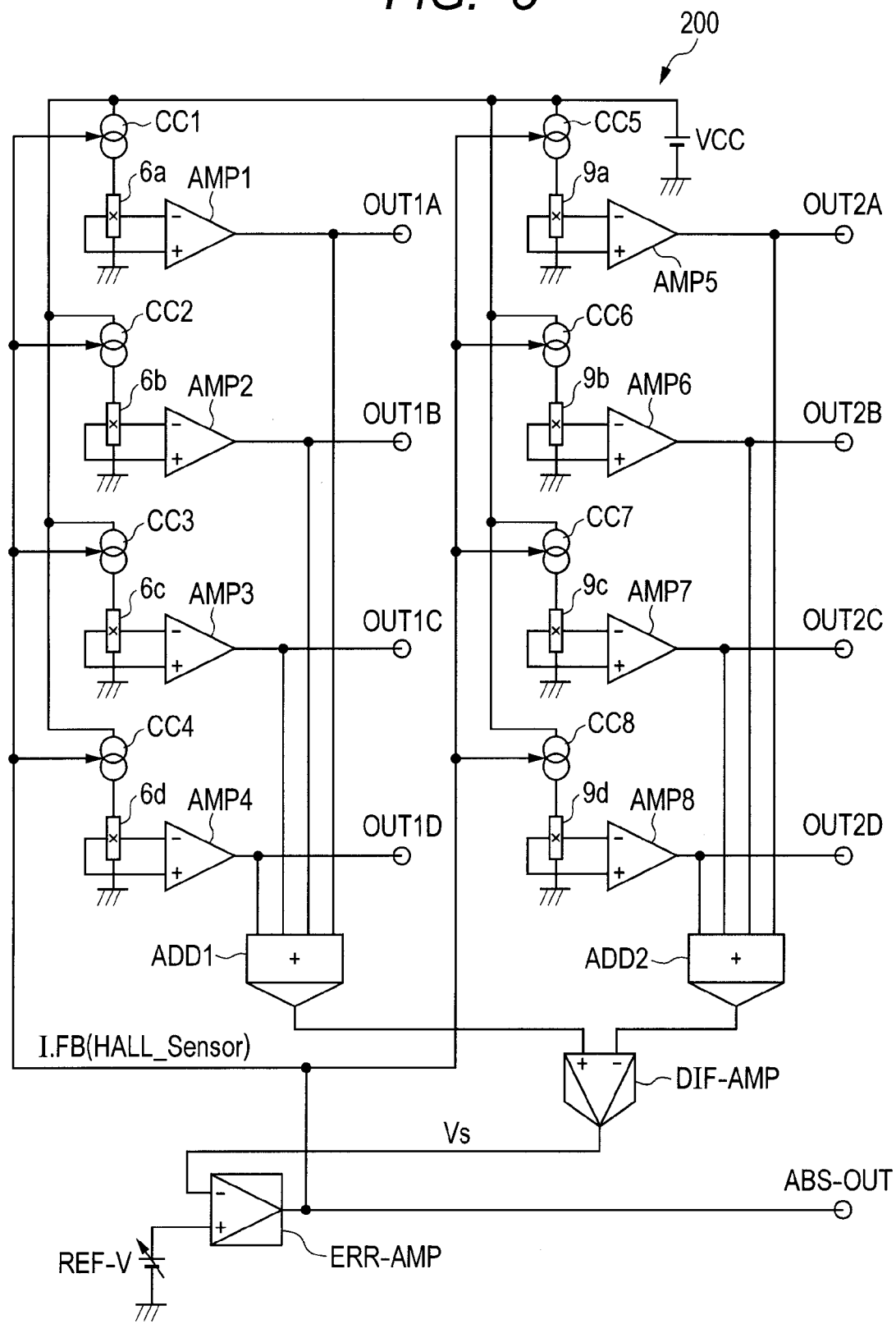
FIG. 5 is an electric circuit diagram illustrating a circuit assembly of a detecting device of the force sensor according to the first embodiment of the present invention.

FIG. 5 shows the electric circuit diagram of the circuit assembly 200 of the force sensor 500. As illustrated in FIG. 5, the circuit assembly 200 is connected to the four first Hall elements 6a to 6d and provided with first constant current sources CC1 to CC4, which supply currents of set current values to the Hall elements 6a to 6d, the quantity (four) thereof corresponding to the quantity of the Hall elements 6a to 6d. The circuit assembly 200 is also connected to the four second Hall elements 9a to 9d and provided with second constant current sources CC5 to CC8, which supply currents of set current values to the Hall elements 9a to 9d, the quantity (four) thereof corresponding to the quantity of the Hall elements 9a to 9d.

The circuit assembly 200 further includes first voltage detectors AMP1 to AMP4, the quantity of which is four, which corresponds to the quantity of the Hall elements 6a to 6d. The detectors AMP1 to AMP4 are connected to the four first Hall elements 6a to 6d to detect the voltage values of the Hall voltages of the Hall elements 6a to 6d. The circuit assembly 200 also includes second voltage detectors AMP5 to AMP8, the quantity of which is four, which corresponds to the quantity of the Hall elements 9a to 9d. The detectors AMP5 to AMP8 are connected to the four second Hall elements 9a to 9d to detect the voltage values of the Hall voltages of the Hall elements 9a to 9d.

The constant current sources CC1 to CC8 are provided for the Hall elements 6a to 6d and 9a to 9d, so that the quantity thereof is eight, which is the same as the quantity of the Hall elements 6a to 6d and 9a to 9d. Similarly, the voltage detectors AMP1 to AMP8 are provided, matching the Hall elements 6a to 6d and 9a to 9d, so that the quantity thereof is eight, which is the same quantity of the Hall elements 6a to 6d and 9a to 9d.

The constant current sources CC1 to CC8 operate to supply constant currents of set current values to the Hall elements 6a to 6d and 9a to 9d. In the present embodiment, the constant current sources CC1 to CC8 are configured to supply current of the same current value to the Hall elements.

The voltage detectors AMP1 to AMP8 are differential amplifiers, which amplify detected Hall voltages of the Hall elements 6a to 6d and 9a to 9d and output voltage signals in magnitudes proportional to the voltage values of the Hall voltages to the processor 300 in the following stage shown in FIG. 1 from output terminals OUT1A to OUT2D.

The processor 300 carries out the aforesaid calculation on the basis of the voltage values of the Hall voltages detected by the voltage detectors AMP1 to AMP8 so as to determine the force component in the direction of each of the three axes orthogonal to each other and the moment component about each axis, to which the operating section 1 is subjected.

As described above, the forces and the moments have been determined by the calculation based on the Hall voltages of the Hall elements 6a to 6d and 9a to 9d, which are generated due to external forces. Meanwhile, the magnetic flux generated in the permanent magnet 8 generally changes according to the temperature thereof. More specifically, the permanent magnet 8 has a negative temperature characteristic in which the magnetic flux thereof reduces as its temperature rises.

In the present embodiment, the circuit assembly 200 has a first adder ADD1, a second adder ADD2 and a differential amplifier DIF-AMP, which constitute a summation calculator, and a differential amplifier ERR-AMP serving as an adjustor. The first adder ADD1 adds voltage signals output from the first voltage detectors AMP1 to AMP4, while the second adder ADD2 adds voltage signals output from the second voltage detectors AMP5 to AMP8.

In the present embodiment, one surface of each of the Hall elements 6a to 6d and 9a to 9d is disposed, opposing the permanent magnet 8. The Hall voltages of the first Hall elements 6a to 6d and the Hall voltages of the second Hall elements 9a to 9d have opposite polarities. To be more specific, the Hall voltages of the first Hall elements 6a to 6d take positive values, whereas the Hall voltages of the second Hall elements 9a to 9d take negative values. Hence, the differential amplifier DIF-AMP subtracts an output result of the second adder ADD2 from an output result of the first adder ADD1 to determine a voltage value Vs of the sum of the absolute values of the voltage values of the Hall voltages detected by the voltage detectors AMP1 to AMP8.

Setting the other surface of each of the second Hall elements 9a to 9d such that it opposes the permanent magnet 8 causes the Hall voltages of the second Hall elements 9a to 9d to take positive values, thus making it possible to use an adder in place of the differential amplifier DIF-AMP as a summation calculator. Alternatively, an adder which receives and adds the voltage signals of all the voltage detectors AMP1 to AMP8 can be used in place of the adders ADD1 and ADD2 and the differential amplifier DIF-AMP as the summation calculator.

The adders ADD1 and ADD2 and the differential amplifier DIF-AMP described above operate to determine the voltage value Vs of the sum of the absolute values of the voltage values of the Hall voltages. The voltage value Vs denotes a value indicative of the sum of the magnetic fluxes detected by the first Hall elements 6a to 6d and the second Hall elements 9a to 9d. The voltage value Vs does not change in response to relative displacements of the first Hall elements 6a to 6d and the second Hall elements 9a to 9d with respect to the permanent magnet 8, but changes when the characteristics of the permanent magnet 8 and the Hall elements 6a to 6d and 9a to 9d change.

For example, if a force Fx in the direction of the X-axis is applied to the operating section 1, causing the Hall elements 6a to 6d and 9a to 9d to be displaced in the direction of the X-axis, then the magnetic flux passing the Hall elements 6a, 6c, 9a and 9c increases with a resultant increase in the Hall voltages. In contrast thereto, the magnetic flux passing the Hall elements 6b, 6d, 9b and 9d decreases and the Hall voltages decrease by the same amount of the aforesaid increase. This means that the total voltage value Vs of all the Hall elements 6a to 6d and 9a to 9d remains unchanged. If the temperature of the permanent magnet 8 rises and the magnetic flux generated in the permanent magnet 8 decreases, then the voltage values of the Hall voltages output from the Hall elements 6a to 6d and 9a to 9d decrease and the total voltage value Vs decreases accordingly.

The differential amplifier ERP-AMP therefore outputs current command signals (I.FB signals), which indicate set current values for setting the total voltage value Vs to a preset reference voltage value REF-V, to the constant current sources CC1 to CC8 on the basis of the difference between an input total voltage value Vs and the preset reference voltage value REF-V.

The reference voltage value REF-V is a fixed value. Maintaining the total voltage value Vs at a fixed voltage value causes the Hall elements 6a to 6d and 9a to 9d to output the same Hall voltages as those in the case where no change in the magnetic flux takes place in the permanent magnet 8.

The constant current sources CC1 to CC8 supply the currents of the set current values based on the input I.FB signals to the Hall elements 6a to 6d and 9a to 9d. The I.FB signals output to the constant current sources CC1 to CC8 share the same value, currents of the same value being supplied to the Hall elements 6a to 6d and 9a to 9d.

Referring to FIGS. 6A and 6B and FIGS. 7A and 7B, the following will specifically describe an operation for correcting the set current values of the constant current sources CC1 to CC8 by a feedback operation.

1. Correction Based on the Temperature Characteristics of the Permanent Magnet 8

Figure 6A:
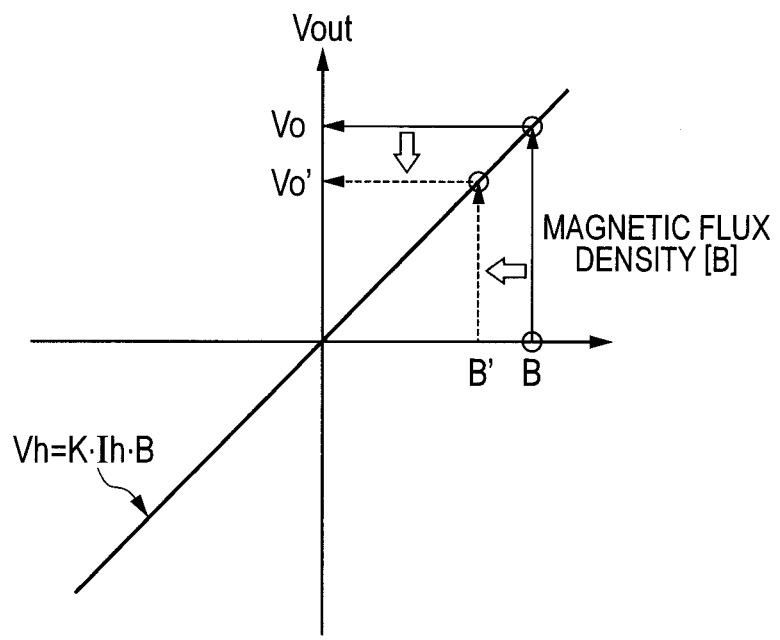
FIG. 6A is a diagram which is used to explain a correcting operation of the circuit assembly in the case where the characteristics of a permanent magnet have changed due to a temperature change in the permanent magnet and which illustrates changes in a total voltage value relative to changes in a magnetic flux density of the permanent magnet.
Figure 6B:
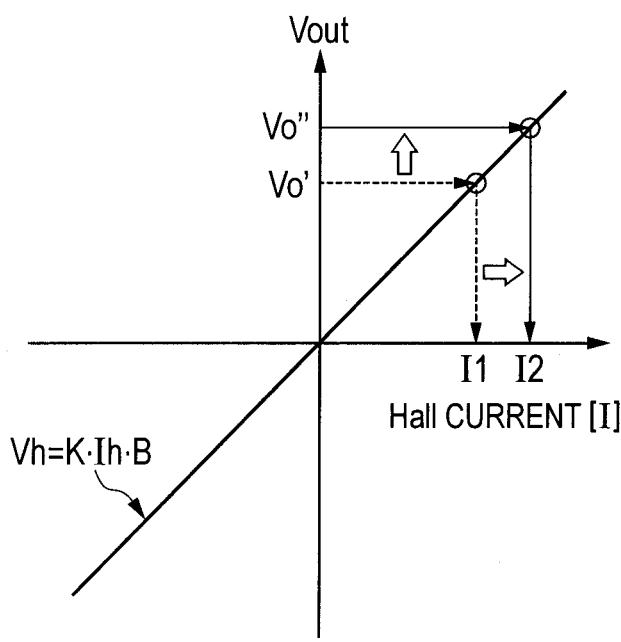
FIG. 6B is a diagram which is used to explain a correcting operation of the circuit assembly in the case where the characteristics of the permanent magnet have changed due to a temperature change in the permanent magnet and which illustrates the current of a constant current source that is corrected on the basis of a difference between a total voltage value and a reference voltage value.

Referring to FIGS. 6A and 6B, the operation for making a correction based on the temperature characteristics of the permanent magnet 8 will be described. In FIGS. 6A and 6B, an example is taken in which a magnetic density B of the permanent magnet 8 at the beginning changes to B' due to a temperature rise.

An output voltage (Hall voltage) Vh of a typical Hall element is expressed as shown below.

$$Vh = K \cdot Ih \cdot B$$

where Vh: Hall voltage; K: sensitivity coefficient; Ih: operating current; and B: magnetic flux density As illustrated in FIG. 6A, the total voltage value of the Hall voltages of all the Hall elements at the magnetic flux density B indicative of an operating point at the beginning is expressed as shown below.

$$Vo = K \cdot I1 \cdot B \tag{1}$$

Further, the total voltage value when the operating point of the magnet has moved to B' due to a temperature rise is expressed as shown below.

$$Vo' = K \cdot I1 \cdot B' \tag{2}$$

In other words, according to the circuit configuration illustrated in FIG. 5, the output voltage Vs of the differential amplifier DIF-AMP will be Vo and Vo'.

If Vs which is a total magnetic flux detection result is Vo, then it is equal to the reference voltage value REF-V, so that the differential amplifier ERR-AMP does not generate a correction voltage. If, however, Vs which is the total magnetic flux detection result obtained when the total magnetic flux has decreased due to thermal demagnetization is Vo', then the differential amplifier ERR-AMP outputs an I·FB signal for generating an error control voltage Vo" obtained by adding the difference between the voltage value Vo' and the reference voltage value REF-V to Vo'. The error control voltage Vo" is generated inversely proportional to an error voltage. Hence, the differential amplifier ERR-AMP outputs an I·FB signal for making an adjustment to increase the current of the Hall elements.

$$I2 = \frac{Vo''}{K \cdot B'} \tag{3}$$

FIG. 6B illustrates the process in which the current values of the constant current sources CC1 to CC8 increase to I2 after the I·FB signal is output to the constant current sources CC1 to CC8 when the magnetic flux density B has decreased.

At this time, according to the circuit configuration shown in FIG. 5, the currents of the constant current sources CC1 to CC8 are controlled such that the error voltage between the total voltage value Vs and the reference voltage value REF-V is decreased by the operation of the differential amplifier ERR-AMP. Thus, an error control voltage Vo" becomes equal to the reference voltage value REF-V.

$$Vo'' \approx REF\text{-}V \approx Vo \quad (4)$$

Therefore, I2 is determined according to the following expression (5).

$$I2 = \frac{Vo}{K \cdot B'} \quad (5)$$

Further, a Hall voltage Vh2 obtained when the operating point of the permanent magnet 8 changes to point B' is determined according to expression (6) given below.

$$Vh2 = K \cdot I2 \cdot B' \quad (6)$$

Substitution of expression (5) leads to expression (7) given below.

$$Vh2 = K \cdot \frac{Vo}{K \cdot B'} \cdot B' \approx Vo \quad (7)$$

In other words, when the magnetic flux decreases from B to B', the total voltage value Vs to be detected decreases from the voltage value Vo, which is equal to the reference voltage value REF-V, to the voltage value Vo'. Thus, the differential amplifier ERR-AMP outputs an I.FB signal for increasing the current values of the constant current sources CC1 to CC8 from I1 to I2 such that the total voltage value Vs becomes the reference voltage value REF-V. This causes the total voltage value Vs to increase from Vo' to Vo" ($\mp$REF-V$\approx$Vo) and to be controlled so as to constantly remain at the reference voltage value REF-V.

Thus, the set current values of the constant current sources CC1 to CC8 are adjusted such that the total voltage value Vs becomes the reference voltage value REF-V by the feedback operation of the differential amplifier ERR-AMP. Further, the set current values of the constant current sources CC1 to CC8, which supply currents to the Hall elements 6a to 6d and 9a to 9d, are adjusted by the differential amplifier ERR-AMP such that the total voltage value Vs becomes the reference voltage value REF-V, thus maintaining the total voltage value Vs at the constant value.

2. Correction of the Sensitivity Coefficient

Generally, the sensitivity coefficient (Hall coefficient) K of a Hall element exhibits dependence on temperature, and the output voltage (Hall voltage) varies according to an environmental temperature or the heat generated in the element even when the magnetic flux density B remains unchanged. The sensitivity coefficients K of other magnetic-electric conversion elements than Hall elements usually have dependence on temperature. The following will describe the Hall elements as representative examples in order to avoid repetitive explanation.

Figure 7A:
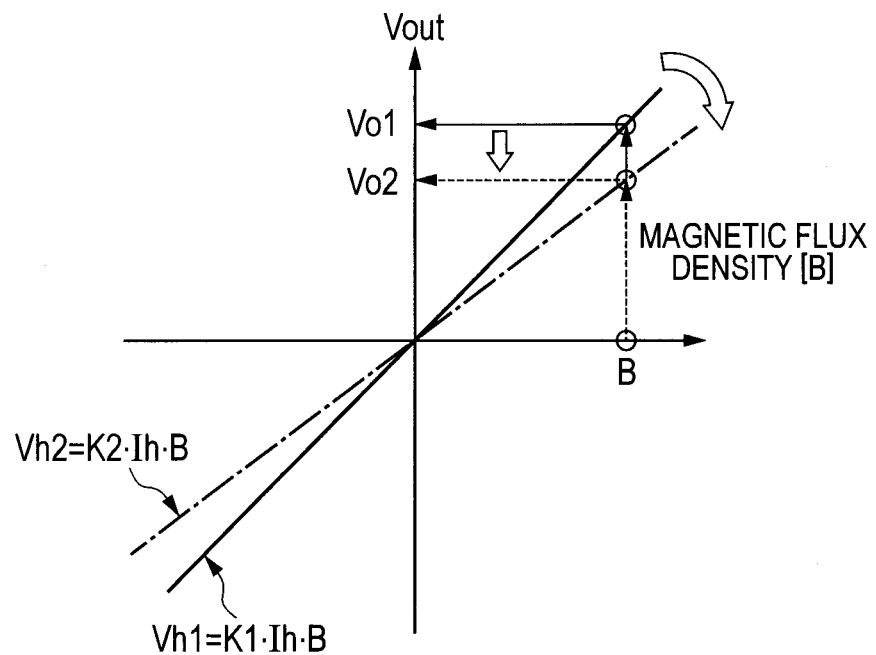
FIG. 7A is a diagram which is used to explain a correcting operation of the circuit assembly in the case where the sensitivity coefficient of a Hall element has changed due to a temperature change in the Hall element and which illustrates a change in a total voltage value relative to a magnetic flux density.
Figure 7B:
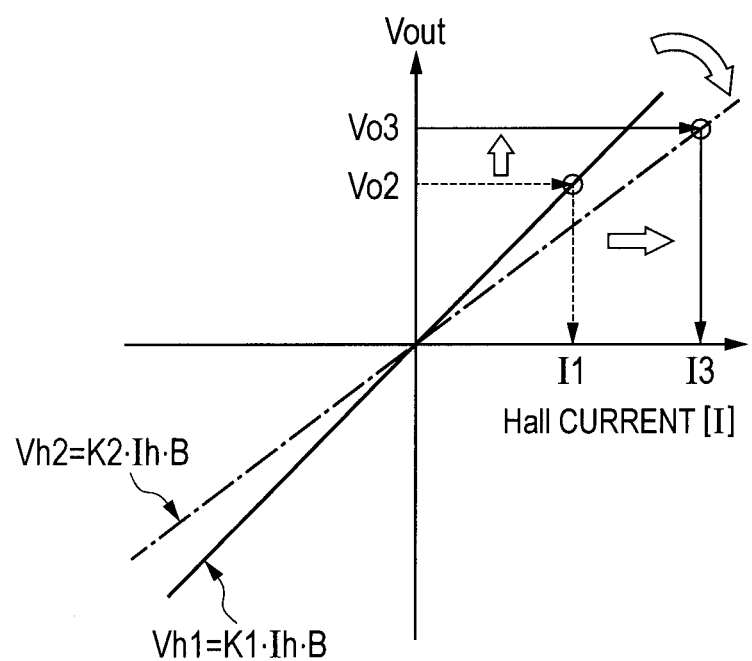
FIG. 7B is a diagram which is used to explain a correcting operation of the circuit assembly in the case where the sensitivity coefficient of a Hall element has changed due to a temperature change in the Hall element and which illustrates the current of the constant current source that is corrected on the basis of a difference between a total voltage value and a reference voltage value.

With reference to FIGS. 7A and 7B, the corrective operation of the sensitivity coefficients K of the Hall elements 6a to 6d and 9a to 9d, which vary with temperature, will be described. FIGS. 7A and 7B illustrate an example in which a sensitivity coefficient K1 at the beginning changes to a sensitivity coefficient K2 as temperature rises.

The total voltage value of the voltage values of the Hall voltages of the Hall elements at the magnetic flux density point B, which is the initial operating point in FIG. 7A, is determined according to expression (8) given below.

$$Vo1 = K1 \cdot I1 \cdot B \quad (8)$$

Further, the total voltage value of the voltage values of the Hall voltages when the sensitivity coefficients of the Hall elements have changed to K2 due to the temperature rise is determined according to expression (9) given below.

$$Vo2 = K2 \cdot I1 \cdot B \quad (9)$$

This means that the output voltages Vs of the differential amplifier DIF-AMP will be Vo1 and Vo2 according to the circuit configuration illustrated in FIG. 5.

If Vs, which is the detection result of a total magnetic flux, is Vo1, then Vs is equal to the reference voltage value REF-V, so that the differential amplifier ERR-AMP does not generate a correction voltage. Meanwhile, if Vs becomes Vo2, which denotes the detection result of a total magnetic flux when the sensitivity coefficients of the Hall elements has changed to K2 and detected Hall voltages have decreased, then the differential amplifier ERR-AMP operates as follows. The differential amplifier ERR-AMP outputs an I·FB signal for generating an error control voltage Vo3 obtained by adding the difference between the voltage value Vo2 and the reference voltage value REF-V to Vo2. The error control voltage Vo3 is generated inversely proportional to an error voltage. Hence, the differential amplifier ERR-AMP outputs an I·FB signal for making an adjustment to increase the currents of the Hall elements.

$$I3 = \frac{Vo3}{K2 \cdot B} \quad (10)$$

FIG. 7B illustrates the process in which the current values of the constant current sources CC1 to CC8 increase to I3 after the I·FB signal is output to the constant current sources CC1 to CC8 when the sensitivity coefficients of the Hall elements have changed to K2 and detected Hall voltages have decreased.

At this time, according to the circuit configuration shown in FIG. 5, the currents of the constant current sources CC1 to CC8 are controlled such that the error voltage between the total voltage value Vs and the reference voltage value REF-V decreases by the operation of the differential amplifier ERR-AMP. Thus, an error control voltage Vo3 becomes equal to the reference voltage value REF-V.

$$Vo3 \approx REF\text{-}V \approx Vo \quad (11)$$

Therefore, I3 is determined according to the following expression (12).

$$I3 = \frac{Vo}{K2 \cdot B} \quad (12)$$

Further, a Hall voltage Vh3 obtained when the sensitivity coefficients of the Hall elements change to point K2 is determined according to expression (13) given below.

$$Vh3 = K2 \cdot I3 \cdot B \quad (13)$$

Substitution of expression (12) leads to expression (14) given below.

$$Vh3 = K2 \cdot \frac{Vo}{K2 \cdot B} \cdot B \approx Vo \quad (14)$$

In other words, when the sensitivity coefficients of the Hall elements decrease from K1 to K2, the total voltage value Vs to be detected decreases from the voltage value Vo1, which is equal to the reference voltage value REF-V, to the voltage value Vo2. Thus, the differential amplifier ERR-AMP outputs an I·FB signal for increasing the current values of the constant current sources CC1 to CC8 from I1 to I3 such that the total voltage value Vs becomes the reference voltage value REF-V. This causes the total voltage value Vs to increase from Vo2 to Vo3 (≈REF-V≈Vo) and to be controlled so as to constantly remain at the reference voltage value REF-V.

Thus, the set current values of the constant current sources CC1 to CC8 are adjusted such that the total voltage value Vs becomes the reference voltage value REF-V by the feedback operation of the differential amplifier ERR-AMP. Further, the set current values of the constant current sources CC1 to CC8, which supply currents to the Hall elements $6a$ to $6d$ and $9a$ to $9d$, are adjusted by the differential amplifier ERR-AMP such that the total voltage value Vs becomes the reference voltage value REF-V, thus maintaining the total voltage value Vs at the constant value.

With the operations described above, even if the magnetic flux of the permanent magnet 8 and the detection sensitivities of the Hall elements $6a$ to $6d$ and $9a$ to $9d$ change due to temperature changes, secular changes or the like, the output voltages of the Hall elements $6a$ to $6d$ and $9a$ to $9d$ remain stable, not being affected by temperature changes, secular changes or the like. Accordingly, even if the characteristics of both the permanent magnet 8 and the Hall elements $6a$ to $6d$ and $9a$ to $9d$ change due to temperature changes, secular changes or the like, the output voltages of the Hall elements $6a$ to $6d$ and $9a$ to $9d$ can be corrected by the simple configuration without using a temperature sensor. This makes it possible to achieve a robot apparatus with improved accuracy of detection of forces and moments.

Second Embodiment

Figure 8:
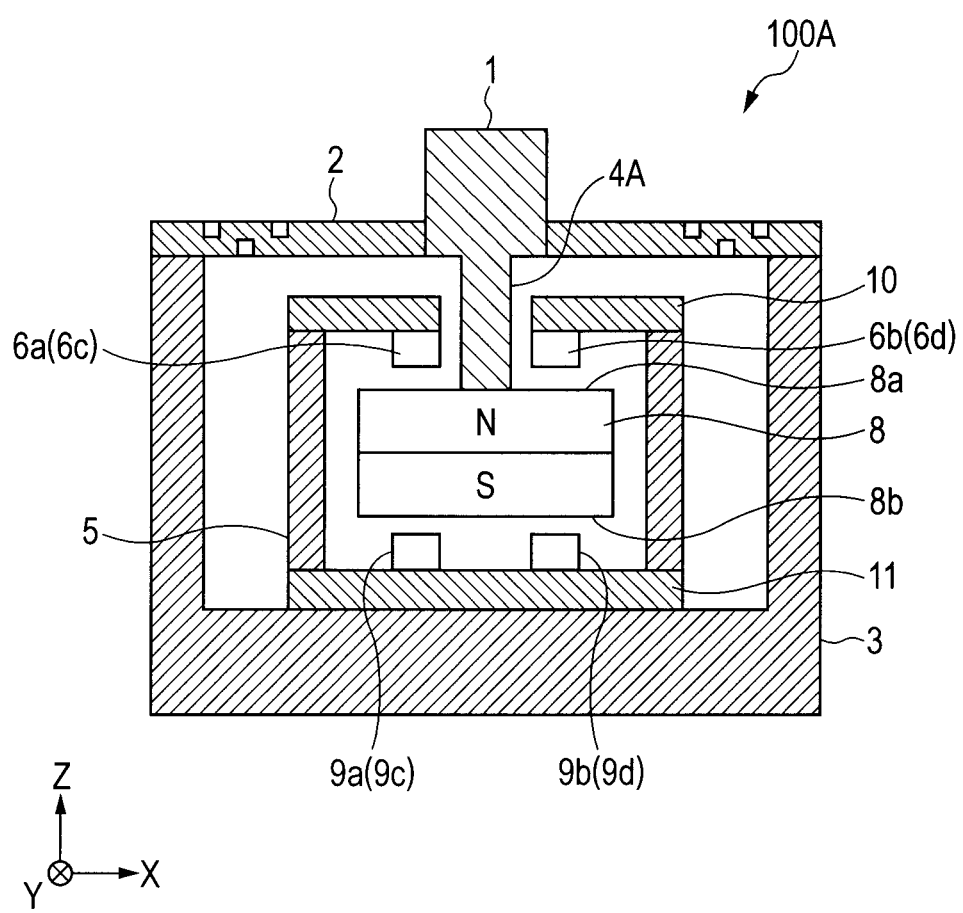
FIG. 8 is a schematic sectional diagram illustrating a sensor main body of a force sensor according to a second embodiment of the present invention.

A force sensor according to a second embodiment of the present invention will now be described. FIG. 8 is a schematic sectional view of a sensor main body of the force sensor according to the second embodiment of the present invention. In the second embodiment, the same components as those in the first embodiment described above will be assigned the same reference numerals and the description thereof will be omitted.

Regarding the force sensor 500 in accordance with the aforesaid first embodiment, the description has been given of the case where the Hall elements $6a$ to $6d$ and $9a$ to $9d$ are displaced together with the operating section 1 in relation to the permanent magnet 8. In a force sensor 500A according to the second embodiment shown in FIG. 8, the permanent magnet 8 is displaced together with the operating section 1 relative to the Hall elements $6a$ to $6d$ and $9a$ to $9d$.

Specifically, a first sensor board 10 to which Hall elements $6a$ to $6d$ are fixed is secured to an outer frame 3 through the intermediary of a board connecting member 5, and a second sensor board 11 to which Hall elements $9a$ to $9d$ are fixed is secured to the outer frame 3. Further, the permanent magnet 8 is secured to an operating section 1 through the intermediary of a columnar support 4A. Thus, the permanent magnet 8 is integrally secured to the operating section 1, so that the permanent magnet 8 is displaced relative to the Hall elements $6a$ to $6d$ and $9a$ to $9d$ when the operating section 1 is displaced.

With this arrangement, the first Hall elements $6a$ to $6d$ are displaced relatively with respect to one pole surface $8a$ as the operating section 1 is displaced, while the second Hall elements $9a$ to $9d$ are displaced relatively with respect to the other pole surface $8b$ as the operating section 1 is displaced.

As described above, according to the second embodiment, even if the magnetic flux of the permanent magnet 8 and the detection sensitivities of the Hall elements $6a$ to $6d$ and $9a$ to $9d$ change due to temperature changes, secular changes or the like, the output voltages of the Hall elements $6a$ to $6d$ and $9a$ to $9d$ remain stable, not being affected by temperature changes, secular changes or the like. Accordingly, even if the characteristics of both the permanent magnet 8 and the Hall elements $6a$ to $6d$ and $9a$ to $9d$ change due to temperature changes, secular changes or the like, the output voltages of the Hall elements $6a$ to $6d$ and $9a$ to $9d$ can be corrected by the simple configuration with no temperature sensor. This permits higher accuracy of detection of forces and moments.

Further, the sensor boards 10 and 11 are secured to the outer frame 3, permitting easier assembly. In other words, it is required simply to dispose the first magnetic-electric conversion elements secured to the outer frame 3 and to dispose the second magnetic-electric conversion elements which are secured to the outer frame 3 with relative positions thereof maintained.

Further, providing the outer frame 3 with a step makes it possible to achieve a construction that obviates the need for the board connecting member 5 for retaining the boards.

Third Embodiment

Figure 9:
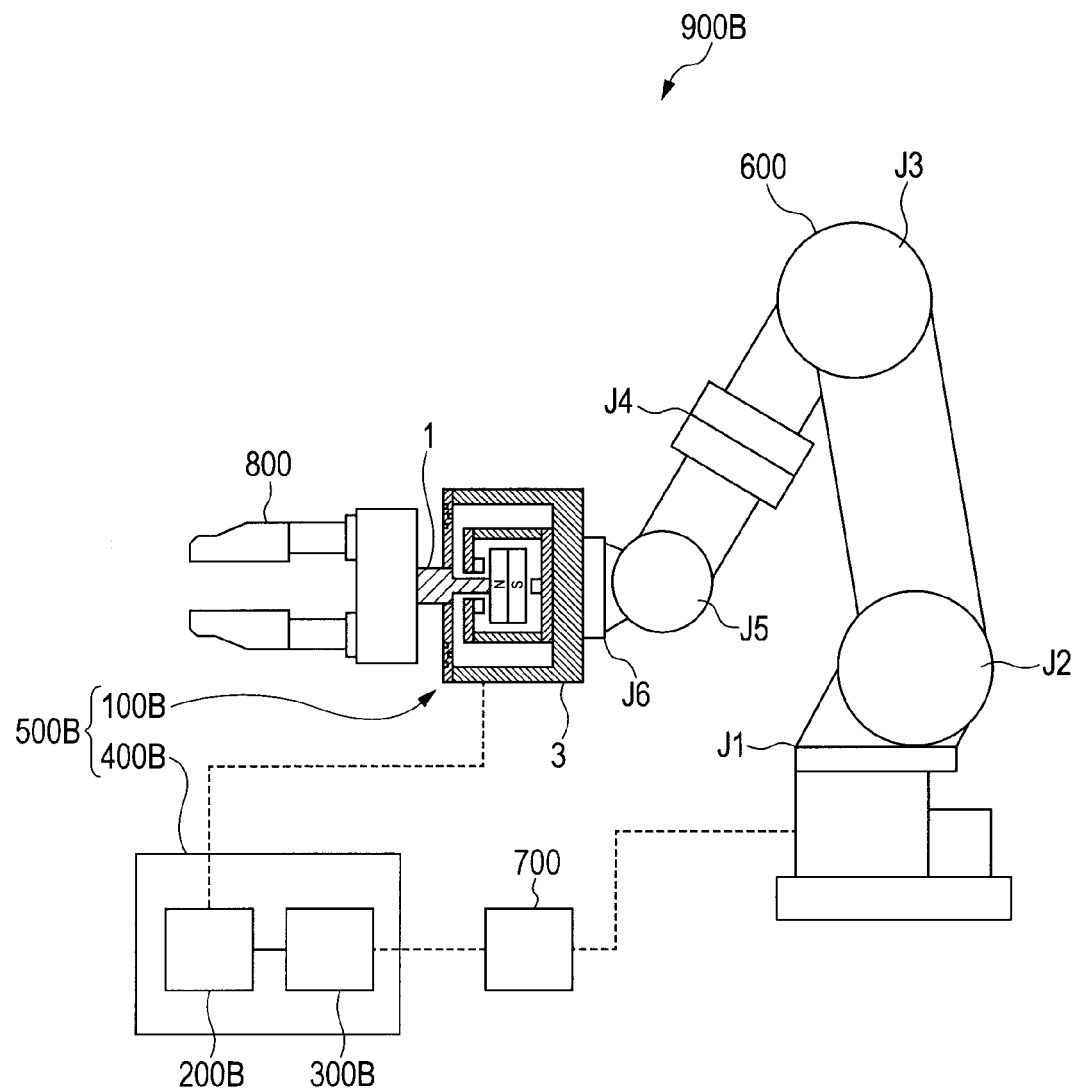
FIG. 9 is a schematic diagram illustrating the construction of a robot apparatus incorporating a force sensor according to a third embodiment of the present invention.

A force sensor according to a third embodiment of the present invention will now be described. FIG. 9 is a schematic diagram of the construction of a robot apparatus which incorporates the force sensor according to the third embodiment of the present invention. In the third embodiment, the same components as those in the aforesaid first embodiment will be assigned the same reference numerals and the descriptions thereof will be omitted.

A robot apparatus 900B shown in FIG. 9 has a multi-joint (six joints J1 to J6 in the third embodiment) robot arm 600 and a robot hand 800 serving as an end effector provided at the distal of the robot arm 600. The robot apparatus 900B further includes a force sensor 500B and a robot controller 700 which controls the operations of the robot arm 600 and the robot hand 800. The force sensor 500B has a sensor main body 100B and a detector 400B connected to the sensor main body 100B. The sensor main body 100B is interposed between the distal end of the robot arm 600 and the robot hand 800. In other words, the sensor main body 100B is directly provided on the distal end of the robot arm 600. Further, the robot hand 800 is provided at the distal end of the robot arm 600 through the intermediary of the sensor main body 100B.

Figure 10:
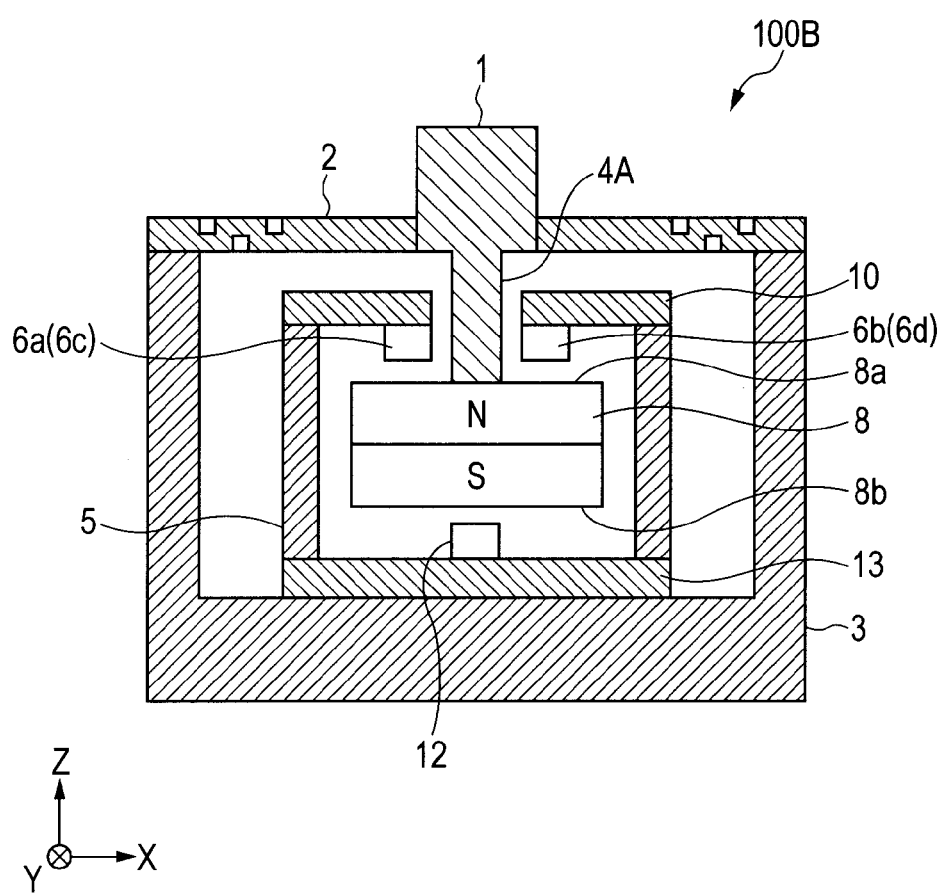
FIG. 10 is a schematic sectional diagram illustrating a sensor main body of a force sensor according to a third embodiment of the present invention.

In the first embodiment described above, the description has been given of the case where the quantity of the first Hall elements is the same as the quantity of the second Hall elements. According to the third embodiment, as illustrated in FIG. 10, the sensor main body 100B has an n number of (n=4, namely, four, in the third embodiment) first Hall elements $6a$ to $6d$ and one second Hall element 12.

Further, regarding the sensor main body 100 in the aforesaid first embodiment, the description has been given of the case where the Hall elements $6a$ to $6d$ and $9a$ to $9d$ are displaced together with the operating section 1 in relation to the permanent magnet 8. In the sensor main body 100B of the force sensor 500B according to the third embodiment shown in FIGS. 9 and 10, a permanent magnet 8 is displaced together with an operating section 1 in relation to the Hall elements $6a$ to $6d$ and 12.

Specifically, a first sensor board 10, to which the first Hall elements $6a$ to $6d$ are fixed, is secured to an outer frame 3 through the intermediary of a board connecting member 5 such that they oppose one pole surface 8a of the permanent magnet 8. A second sensor board 13, to which the second Hall element 12 is fixed, is secured to the outer frame 3 such that the second Hall element 12 opposes the other pole surface 8b of the permanent magnet 8. Further, the permanent magnet 8 is secured to an operating section 1 through the intermediary of a columnar support 4A. Thus, the permanent magnet 8 is integrally secured to the operating section 1, so that the permanent magnet 8 is displaced relative to the Hall elements 6a to 6d and 12 when the operating section 1 is displaced.

With this arrangement, the first Hall elements 6a to 6d are displaced relatively with respect to one pole surface 8a as the operating section 1 is displaced, while the second Hall element 12 is displaced relatively with respect to the other pole surface 8b as the operating section 1 is displaced.

As illustrated in FIG. 9, one of the operating section 1 and the outer frame 3 of the sensor main body 100B, namely, the outer frame 3 in the third embodiment, is secured to the distal end of the robot arm 600 and the other, namely, the operating section 1 in the third embodiment, is secured to the robot hand 800. Alternatively, the outer frame 3 may be secured to the robot hand 800 and the operating section 1 may be secured to the distal end of the robot arm 600. A detecting device 400B shown in FIG. 9 includes a circuit assembly 200B which detects the Hall voltages from the Hall elements 6a to 6d and 12 of the sensor main body 100B and outputs the detection results, and a processor 300B which determines a force and a moment acting on the operating section 1. The processor 300B sends the force component outputs to a robot controller 700. The robot controller 700 controls the posture of the robot arm 600 on the basis of the force components.

Figure 11:
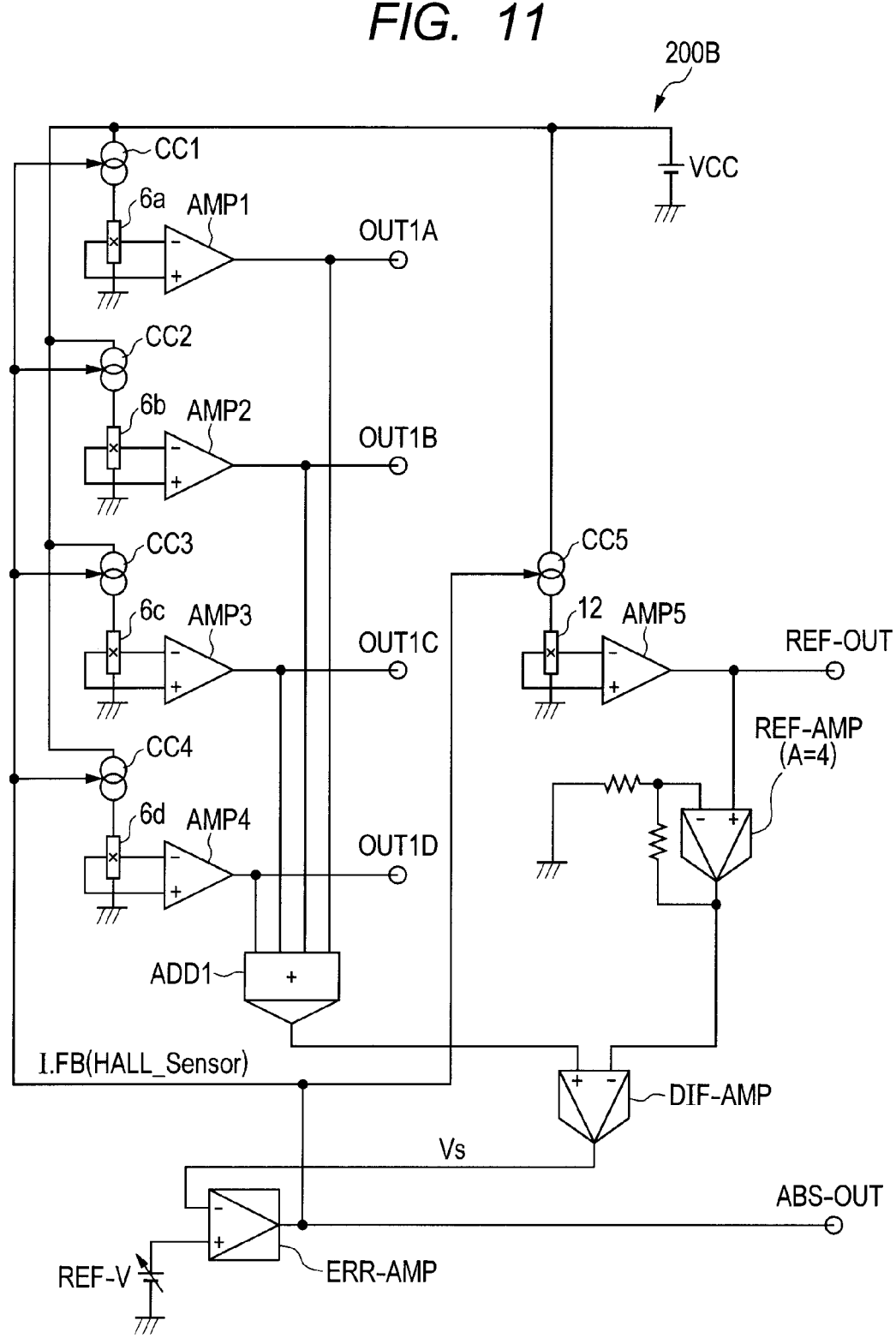
FIG. 11 is an electric circuit diagram illustrating a circuit assembly of a detecting device of the force sensor according to the third embodiment of the present invention.

FIG. 11 is an electric circuit diagram of the circuit assembly 200B of the force sensor 500B according to the third embodiment. The circuit assembly 200B is connected to the four first Hall elements 6a to 6d and provided with first constant current sources CC1 to CC4, which supply currents of set current values to the first Hall elements 6a to 6d, the quantity (four) thereof corresponding to the quantity of the Hall elements 6a to 6d. The circuit assembly 200B is connected to the second Hall element 12 and provided with a second constant current source CC5, which supplies a current of a set current value to the second Hall element 12.

The circuit assembly 200B further includes first voltage detectors AMP1 to AMP4, the quantity of which is four, which corresponds to the quantity of the Hall elements 6a to 6d. The detectors AMP1 to AMP4 are connected to the four first Hall elements 6a to 6d to detect the voltage values of the Hall voltages of the first Hall elements 6a to 6d. The circuit assembly 200B also includes a second voltage detector AMP5, which is connected to the second Hall element 12 to detect the voltage value of the Hall voltage of the second Hall element 12.

Further, the circuit assembly 200B has an adder ADD1, an amplifier REF-AMP and a differential amplifier DIF-AMP constituting a total calculator, and a differential amplifier ERR-AMP as an adjustor.

The adder ADD1 adds the voltage signals output from the first voltage detectors AMP1 to AMP4. The amplifier REF-AMP outputs a voltage signal indicating a voltage value of n times (four times) the voltage value of the Hall voltage detected by the second voltage detector AMP5. Thus, the output level of the second voltage detector AMP5 is substantially matched to the output level of the adder ADD1.

The differential amplifier DIF-AMP subtracts an output result of the amplifier REF-AMP from an output result of the adder ADD1. Thus, the differential amplifier DIF-AMP determines a total voltage value Vs of the absolute values of the voltage values of the Hall voltages detected by the first voltage detectors AMP1 to AMP4 and the absolute value of the voltage value that is four times the voltage value of the Hall voltage detected by the second voltage detector AMP5.

As with the first embodiment described above, the differential amplifier ERR-AMP compares the total voltage value Vs with a reference voltage value REF-V and adjusts the current values of the constant current sources CC1 to CC5 such that the total voltage value Vs becomes the reference voltage value REF-V.

As described above, according to the third embodiment, even if the magnetic flux of the permanent magnet 8 and the detection sensitivities of the Hall elements 6a to 6d and 12 change due to temperature changes, secular changes or the like, the output voltages of the Hall elements 6a to 6d and 12 remain stable, not being affected by temperature changes, secular changes or the like. Accordingly, even if the characteristics of both the permanent magnet 8 and the Hall elements 6a to 6d and 12 change due to temperature changes, secular changes or the like, the output voltages of the Hall elements 6a to 6d and can be corrected by the simple configuration with no temperature sensor. This permits higher accuracy of detection of forces and moments. Further, only one second Hall element 12 is provided, requiring only one second constant current source CC5 and only one second voltage detector AMP5. Hence, the cost can be reduced, as compared with the force sensor of the aforesaid first embodiment. In addition, the sensor boards 10 and 13 are secured to the outer frame 3, permitting easier assembly. Further, providing the outer frame 3 with a step makes it possible to achieve a robot apparatus incorporating a force sensor which has a construction that obviates the need for the board connecting member 5 for retaining the boards.

Fourth Embodiment

Figure 12:
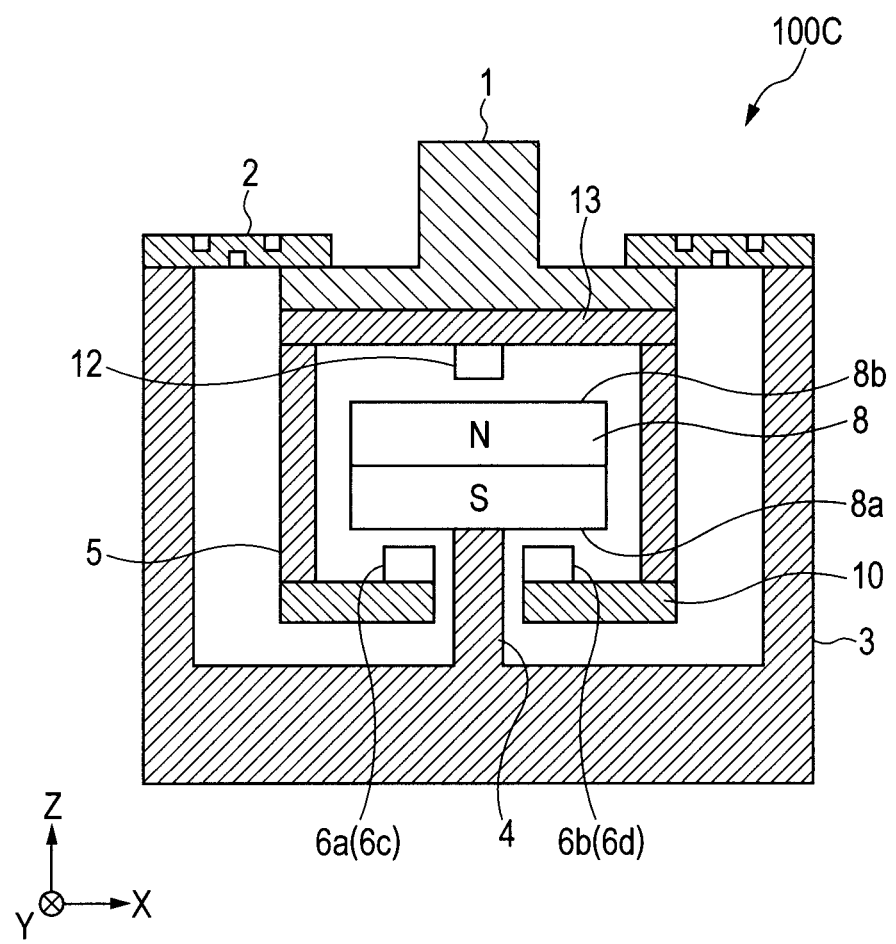
FIG. 12 is a schematic sectional diagram illustrating a sensor main body of a force sensor according to a fourth embodiment of the present invention.

A force sensor according to a fourth embodiment of the present invention will now be described. FIG. 12 is a schematic sectional view of a sensor main body of the force sensor according to the fourth embodiment of the present invention. In the fourth embodiment, the same components as those in the first to the third embodiments will be assigned the same reference numerals and the descriptions thereof will be omitted.

A sensor main body 100C of the force sensor illustrated in FIG. 12 has an n number of (n=4, namely, four, in the fourth embodiment) first Hall elements 6a to 6d and one second Hall element 12. A first sensor board 10, to which the first Hall elements 6a to 6d are fixed, is secured to an operating section 1 through the intermediary of a board connecting member 5 such that the first Hall elements 6a to 6d oppose one pole surface 8a of a permanent magnet 8. A second sensor board 13, to which the second Hall element 12 is fixed, is secured to the operating section 1 such that the second Hall element 12 opposes the other pole surface 8b of the permanent magnet 8. Thus, the Hall elements 6a to 6d and 12 are displaced relative to the permanent magnet 8, which is integrally secured to an outer frame 3, when the operating section 1 is displaced. The fourth embodiment with the construction described above provides the same advantages as those of the aforesaid third embodiment.

Fifth Embodiment

Figure 13:
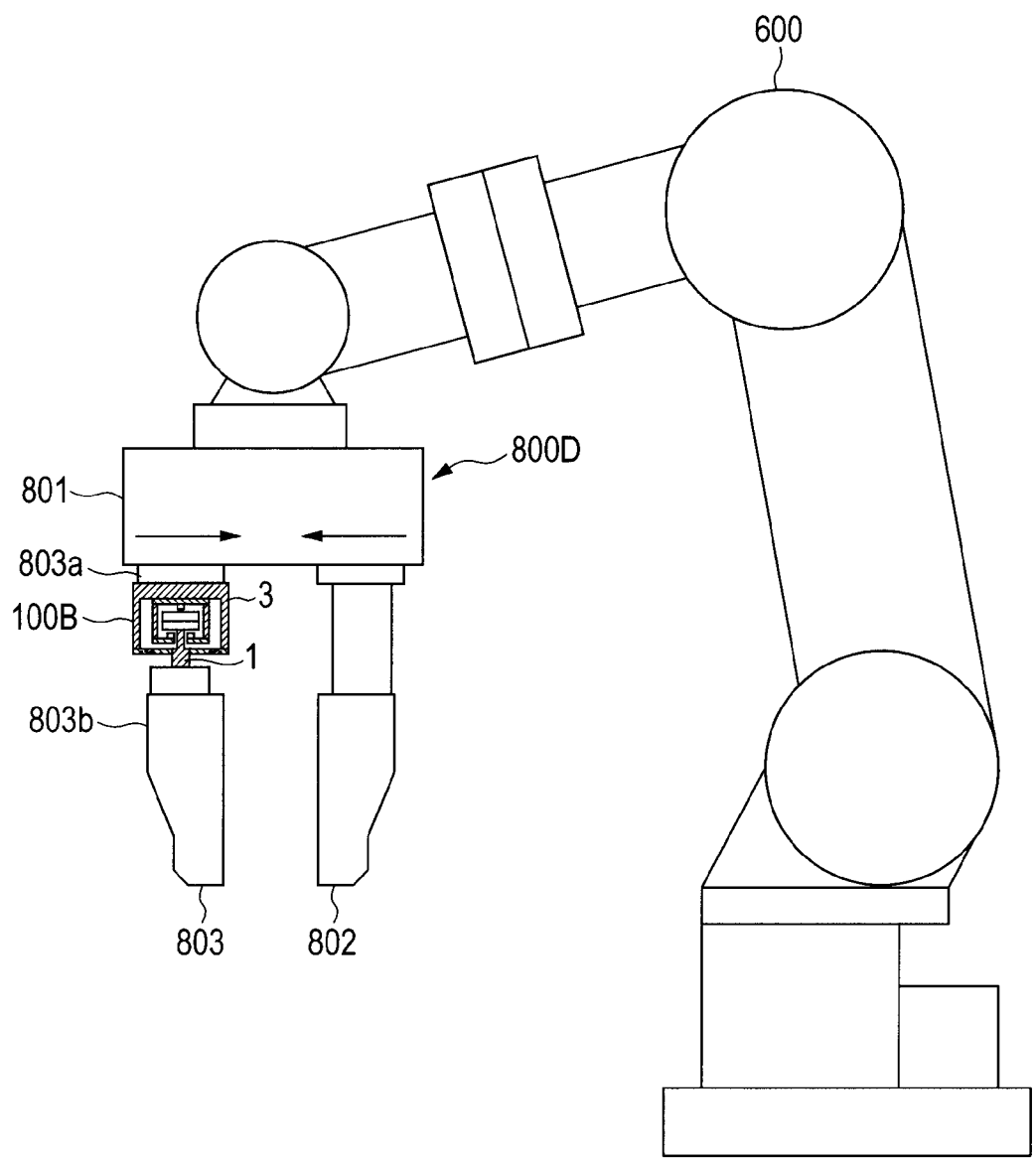
FIG. 13 is a schematic diagram illustrating the construction of a robot apparatus having a robot hand which incorporates a force sensor according to a fifth embodiment of the present invention.

A robot hand incorporating a force sensor according to a fifth embodiment of the present invention will now be described. FIG. 13 is a schematic diagram illustrating the construction of a robot apparatus which has a robot hand incorporating the force sensor according to the fifth embodiment of the present invention. In the fifth embodiment, the same components as those in the first to the fourth embodiments will be assigned the same reference numerals and the description thereof will be omitted.

A robot hand 800D shown in FIG. 13 has a hand main body 801 and a plurality of (two in the present embodiment) spreadable fingers 802 and 803 supported by the hand main body 801. The finger 803 has a proximal portion 803a supported by the hand main body 801 and a distal portion 803b extended from the proximal portion 803a.

The robot hand 800D may be provided with any one of the force sensors in the first to the fourth embodiments described above. In the fifth embodiment, the robot hand 800D is provided with the same force sensor as that in the aforesaid third embodiment. A sensor main body 100B of the force sensor is interposed between the proximal portion 803a and the distal portion 803b. One of an outer frame 3 and an operating section 1 (the outer frame 3 in the fifth embodiment) is secured to the proximal portion 803a. Further, the other one of the outer frame 3 and the operating section 1 (the operating section 1 in the fifth embodiment) is secured to the distal portion 803b.

Alternatively, the outer frame 3 may be secured to the distal portion 803b, while the operating section 1 may be secured to the proximal portion 803a. Further, the finger 802 may be provided with the sensor main body 100B.

The fifth embodiment provides the same advantages as those of the aforesaid third embodiment. Further, providing the outer frame 3 with a step makes it possible to achieve a robot apparatus with a robot hand having a construction that obviates the need for a board connecting member 5 for retaining the boards.

Although the present invention has been described on the basis of the first to the fifth embodiments, the present invention is not limited thereto. In the first and the second embodiments, the case has been described where the force sensor has the four first Hall elements and the four second Hall elements to determine the force component in the direction of each of the three axes and the moment component about each of the three axes; however, the present invention is not limited thereto. Minimal required quantities of the first and the second Hall elements are two. Further, at least forces or moments may be determined and, for example, only forces or only moments may be determined to control a robot apparatus.

In the third and the fourth embodiments, the case has been described where the force sensor has the four first Hall elements to determine the force component in the direction of each of the three axes and the moment component about each of the three axes; however, the present invention is not limited thereto. The minimum required quantity of the first Hall elements is two. Further, at least forces or moments may be determined and, for example, only forces or only moments may be determined to control a robot apparatus.

In the robot hand of the fifth embodiment, only one of the two fingers is provided with the sensor main body of the force sensor. Alternatively, however, each of a plurality of fingers may be provided with the sensor main body and the operation of the robot may be controlled on the basis of the total value of forces. The number of the fingers may be two or more, and the mounting position of the force sensor may be the distal end of a finger.

In the first to the fourth embodiments, the mounting position of the force sensor is not limited to the end effector and may be incorporated in each joint, as necessary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-029738, filed Feb. 15, 2011, which is hereby incorporated by reference herein in its entirety.

What is claimed is:

1. A force sensor comprising:
a sensor main body; and
a detecting device connected to the sensor main body, wherein the sensor main body comprises:
a frame;
an operating section which is elastically supported by the frame and which is displaced relative to the frame when subjected to an external force;
a magnet which is disposed in the frame and secured to the frame;
a first magnetic-electric conversion element which is secured to the operating section, facing against one pole surface of the magnet, and which is disposed such that it can be displaced together with the operating section in relation to the one pole surface;
a second magnetic-electric conversion element which is secured to the operating section, facing against the other pole surface of the magnet, and which is disposed such that it can be displaced together with the operating section in relation to the other pole surface; and
the detecting device
determines at least one of a force and a moment acting on the operating section on the basis of voltage values of voltages output by the first magnetic-electric conversion element and the second magnetic-electric conversion element,
determines the total voltage value of absolute values of the voltage values output by the first and the second magnetic-electric conversion elements, and
adjusts the values of currents supplied to the first and the second magnetic-electric conversion elements such that the total voltage value becomes a predetermined reference voltage value.

2. A robot apparatus comprising:
a multi-joint robot arm; and
a force sensor according to claim 1,
wherein the sensor main body is provided on the robot arm.

3. A robot hand comprising:
a hand main body;
a finger supported by the hand main body; and
a force sensor according to claim 1,
wherein the sensor main body is provided on the finger.

4. A force sensor comprising:
a sensor main body; and
a detecting device connected to the sensor main body, wherein the sensor main body comprises:
a frame;
an operating section which is elastically supported by the frame and which is displaced relative to the frame when subjected to an external force;
a magnet which is disposed in the frame, secured to the frame, and displaced integrally with the operating section;
a first magnetic-electric conversion element which is secured to the frame, facing against one pole surface of the magnet; and a second magnetic-electric conversion element which is secured to the frame such that the second magnetic-electric conversion element opposes the other pole surface of the magnet and maintains a mutual relative position to the first magnetic-electric conversion element; and the detecting device determines at least one of a force and a moment acting on the operating section on the basis of voltage values of voltages output by the first magnetic-electric conversion element and the second magnetic-electric conversion element, determines the total voltage value of absolute values of the voltage values output by the first and the second magnetic-electric conversion elements, and adjusts the values of currents supplied to the first and the second magnetic-electric conversion elements such that the total voltage value becomes a predetermined reference voltage value.

5. A robot apparatus comprising:
a multi-joint robot arm; and
a force sensor according to claim 4,
wherein the sensor main body is provided on the robot arm.

6. A robot hand comprising:
a hand main body;
a finger supported by the hand main body; and
a force sensor according to claim 4,
wherein the sensor main body is provided on the finger.

7. A force sensor comprising:
a sensor main body; and
a detecting device connected to the sensor main body,
wherein the sensor main body comprises:
a frame;
an operating section which is elastically supported by the frame and which is displaced relative to the frame when subjected to an external force;
a magnet which is disposed in the frame and secured to the frame;
an n number (n denoting an integer of 2 or more) of first magnetic-electric conversion elements which are secured to the operating section with intervals provided thereamong, facing against one pole surface of the magnet, and which are disposed such that the first magnetic-electric conversion elements can be displaced together with the operating section relative to the one pole surface; and
one second magnetic-electric conversion element which is secured to the operating section, facing against the other pole surface of the magnet and which is disposed such that the second magnetic-electric conversion element can be displaced together with the operating section relative to the other pole surface, and the detecting device determines at least one of a force and a moment acting on the operating section on the basis of the voltage values of voltages output from the n number of the first magnetic-electric conversion elements and the voltage value of a voltage output from the second magnetic-electric conversion element, determines the total voltage value of the absolute values of the voltage values output from the first magnetic-electric conversion elements and the absolute value of a voltage value that is n times the voltage value output from the second magnetic-electric conversion element, and adjusts the values of currents supplied to the first and the second magnetic-electric conversion elements such that the total voltage value becomes a predetermined reference voltage value.

8. A robot apparatus comprising:
a multi-joint robot arm; and
a force sensor according to claim 7,
wherein the sensor main body is provided on the robot arm.

9. A robot hand comprising:
a hand main body;
a finger supported by the hand main body; and
a force sensor according to claim 7,
wherein the sensor main body is provided on the finger.

10. A force sensor comprising:
a sensor main body; and
a detecting device to which the sensor main body is connected,
wherein the sensor main body comprises:
a frame;
an operating section which is elastically supported by the frame and which is displaced relative to the frame when subjected to an external force;
a magnet which is disposed in the frame, secured to the operating section, and displaced integrally with the operating section;
an n number (n denoting an integer of 2 or more) of first magnetic-electric conversion elements which are secured to the frame with intervals provided thereamong, facing against one pole surface of the magnet; and
a second magnetic-electric conversion element which is secured to the frame such that the second magnetic-electric conversion element opposes the other pole surface of the magnet and maintains a mutual relative position to the first magnetic-electric conversion elements, and the detecting device determines at least one of a force and a moment acting on the operating section on the basis of the voltage values of voltages output from the n number of the first magnetic-electric conversion elements and the voltage value of a voltage output from the second magnetic-electric conversion element, determines the total voltage value of the absolute values of the voltage values of voltages output from the first magnetic-electric conversion elements and the absolute value of a voltage value that is n times the voltage value output from the second magnetic-electric conversion element, and adjusts the values of currents supplied to the first and the second magnetic-electric conversion elements such that the total voltage value becomes a predetermined reference voltage value.

11. A robot apparatus comprising:
a multi-joint robot arm; and
a force sensor according to claim 10,
wherein the sensor main body is provided on the robot arm.

12. A robot hand comprising:
a hand main body;
a finger supported by the hand main body; and
a force sensor according to claim 10,
wherein the sensor main body is provided on the finger.

13. A detecting device which is connected to a sensor main body having a frame, an operating section, which is elastically supported by the frame and displaced relative to the frame when subjected to an external force, a magnet disposed in the frame, a first magnetic-electric conversion element disposed, opposing one pole surface of the magnet, and a second magnetic-electric conversion element disposed, opposing the other pole surface of the magnet, and which detects a force or a moment acting on the operating section,
wherein the detecting device
determines at least one of a force and a moment acting on the operating section on the basis of the voltage values of voltages output from the first magnetic-electric conversion element and the second magnetic-electric conversion element,
determines the total voltage value of the absolute values of the voltage values of voltages output from the first and the second magnetic-electric conversion elements, and
adjusts the values of currents supplied to the first and the second magnetic-electric conversion elements such that the total voltage value becomes a predetermined reference voltage value.

* * * * *